US011023505B2

(12) United States Patent
Chi et al.

(10) Patent No.: US 11,023,505 B2
(45) Date of Patent: Jun. 1, 2021

(54) METHOD AND APPARATUS FOR PUSHING INFORMATION

(71) Applicant: Beijing Baidu Netcom Science and Technology Co., Ltd., Beijing (CN)

(72) Inventors: Jianfeng Chi, Beijing (CN); Weidong Guo, Beijing (CN); Yajuan Lv, Beijing (CN); Yile Chen, Beijing (CN); Jinwen Luo, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 401 days.

(21) Appl. No.: 15/926,584

(22) Filed: Mar. 20, 2018

(65) Prior Publication Data
US 2019/0005121 A1    Jan. 3, 2019

(30) Foreign Application Priority Data

Jun. 29, 2017 (CN) .......................... 201710515780.7

(51) Int. Cl.
| | |
|---|---|
| *G06F 16/33* | (2019.01) |
| *G06N 7/00* | (2006.01) |
| *G06N 20/00* | (2019.01) |
| *G06F 16/31* | (2019.01) |
| *G06F 16/953* | (2019.01) |
| *G06N 20/10* | (2019.01) |
| *G06F 40/205* | (2020.01) |
| *G06N 3/04* | (2006.01) |

(52) U.S. Cl.
CPC ........ *G06F 16/3334* (2019.01); *G06F 16/313* (2019.01); *G06F 16/953* (2019.01); *G06F 40/205* (2020.01); *G06N 7/005* (2013.01); *G06N 20/00* (2019.01); *G06N 20/10* (2019.01); *G06N 3/0454* (2013.01); *G06N 3/0481* (2013.01)

(58) Field of Classification Search
CPC ......... G06F 17/30663; G06F 17/30616; G06F 15/18; G06F 17/3705; G06N 7/005
USPC ....................................................... 707/736
See application file for complete search history.

(56) References Cited

U.S. PATENT DOCUMENTS

| | | | | |
|---|---|---|---|---|
| 6,701,362 | B1 * | 3/2004 | Subramonian | H04L 29/06 709/224 |
| 6,981,040 | B1 * | 12/2005 | Konig | G06N 20/00 |

(Continued)

FOREIGN PATENT DOCUMENTS

| | | |
|---|---|---|
| CN | 103336836 A | 10/2013 |
| CN | 103970800 A | 8/2014 |

(Continued)

*Primary Examiner* — Hosain T Alam
*Assistant Examiner* — Robert F May
(74) *Attorney, Agent, or Firm* — Nixon Peabody LLP

(57) ABSTRACT

A method and apparatus for pushing information. A specific implementation of the method includes: parsing page content browsed by a user to extract a keyword of the page content and determine a theme corresponding to the keyword; determining a preset keyword matching the keyword in a preset keyword collection; determining an associated keyword associated with the determined preset keyword based on a pre-established associated relationship of the preset keyword; and pushing information corresponding to the theme and/or the associated keyword to the user. This implementation implements targeted information push.

17 Claims, 6 Drawing Sheets

(56) References Cited

U.S. PATENT DOCUMENTS

| | | | | |
|---|---|---|---|---|
| 8,108,376 B2* | 1/2012 | Okamoto | ............ | G06F 16/355 |
| | | | | 707/705 |
| 2011/0106829 A1* | 5/2011 | Pradhan | ................ | G06F 16/335 |
| | | | | 707/765 |
| 2012/0066072 A1* | 3/2012 | Kanigsberg | ......... | G06F 16/9535 |
| | | | | 705/14.66 |
| 2013/0080430 A1* | 3/2013 | Vandermolen | ........ | G06F 3/0482 |
| | | | | 707/736 |

FOREIGN PATENT DOCUMENTS

| | | | | |
|---|---|---|---|---|
| CN | 104239552 A | 12/2014 | | |
| CN | 104933172 A * | 9/2015 | ............ | G06F 16/00 |
| CN | 105139237 A | 12/2015 | | |
| CN | 105701155 A | 6/2016 | | |
| CN | 105893611 A | 8/2016 | | |

\* cited by examiner

METHOD AND APPARATUS FOR PUSHING INFORMATION

CROSS-REFERENCE TO RELATED APPLICATIONS

This application is related to and claims the priority from Chinese Application No. 201710515780.7, filed on Jun. 29, 2017, entitled "Method and Apparatus for Pushing Information," the entire disclosure of which is incorporated herein by reference.

TECHNICAL FIELD

The present disclosure relates to the field of computer technologies, specifically to the field of Internet technologies, and more specifically, to a method and apparatus for pushing information.

BACKGROUND

With the development of Internet technologies, acquiring information through applications installed on smart devices has become a common way of acquiring information in one's daily life. Generally, the most interested information needs to be recommended to users in a personalized fashion to reduce time spent by the users in searching on the Internet.

In an existing method, typically, co-occurred keywords co-appearing in search keywords in a search data result are counted, and then information on co-occurred keywords whose frequency of co-occurrence is higher is pushed. However, using this method it is impossible to analyze words having lower frequency of co-occurrence. Therefore, there exists a problem that information push is less targeted.

SUMMARY

Embodiments of the present disclosure provide an improved method and apparatus for pushing information to solve the technical problem mentioned in the foregoing Background section.

In a first aspect, an embodiment of the present disclosure provides a method for pushing information, which comprises: parsing page content browsed by a user to extract a keyword of the page content and determine a theme corresponding to the keyword; determining a preset keyword matching the keyword in a preset keyword collection; determining an associated keyword associated with the determined preset keyword based on a pre-established associated relationship of the preset keyword; and pushing information corresponding to the theme and/or the associated keyword to the user.

In some embodiments, the parsing page content browsed by a user to extract a keyword of the page content and determine a theme corresponding to the keyword comprises: parsing the page content browsed by the user to extract the keyword of the page content, and inputting the keyword into a pregenerated theme probability distribution model to obtain at least one first candidate theme and a probability of determining each one of the at least one first candidate theme as the theme corresponding to the keyword; inputting the keyword into a pregenerated generalization model to obtain at least one second candidate theme and a similarity between the keyword and each one of the at least one second candidate theme; and fusing the at least one first candidate theme and the at least one second candidate theme to determine the theme corresponding to the keyword.

In some embodiments, before the parsing the page content browsed by the user to extract the keyword of the page content and determine the theme corresponding to the keyword, the method further comprises generating the theme probability distribution model, comprising: parsing a plurality of preset texts to determine a keyword and a theme of each text and establish a corresponding relationship between the keyword and the theme of the text; performing statistical calculation on the established corresponding relationship to determine a number of times of establishing the corresponding relationship between each keyword and each theme; and generating the theme probability distribution model corresponding to the each determined keyword based on the number of times of establishing the corresponding relationship between the each keyword and the each theme.

In some embodiments, before parsing the page content browsed by the user to extract the keyword of the page content and determine the theme corresponding to the keyword, the method further comprises generating the generalization model, comprising: parsing a plurality of preset texts to generate a keyword collection for each text and determine a theme of the each text; merging the keyword collections corresponding to the texts having same themes to generate a keyword collection corresponding to the each determined theme; for the each determined theme, extracting a characteristic keyword from the keyword collection corresponding to the theme based on a chi-square test method; and training by using the characteristic keyword corresponding to each theme as input based on a machine learning method to obtain the generalization model.

In some embodiments, the parsing a plurality of preset texts to generate a keyword collection for each text and determine a theme of the each text comprises: performing, for the each text among the plurality of preset texts, a word segmentation on the text, and deleting a stop word, a preposition and an adverb among a plurality of words obtained after the word segmentation to obtain the keyword collection corresponding to the text; and inputting the each text into a pretrained theme model to determine the theme of the each text, the theme model being configured to characterize a corresponding relationship between the text and the theme.

In some embodiments, before parsing page content browsed by a user to extract a keyword of the page content and determine a theme corresponding to the keyword, the method further comprises establishing the associated relationship of the preset keyword, comprising: parsing historical search data and historical browsing data to determine a first keyword and at least one second keyword associated with each first keyword; respectively calculating a similarity between the first keyword and each one of the at least one second keyword and each preset keyword in the preset keyword collection, to determine a preset keyword in the preset keyword collection having the maximum similarity to the first keyword as a first preset keyword, and respectively determine a preset keyword in the preset keyword collection having the maximum similarity to each second keyword as a second preset keyword; and respectively establishing the associated relationship between the first preset keyword and each second preset keyword.

In some embodiments, after respectively establishing the associated relationship between the first preset keyword and each second preset keyword, the method further comprises: counting up a number of co-occurrences of the first preset keyword and the each second preset keyword according to the historical search data and the historical browsing data; and determining a probability of transition from the first preset keyword to the each second preset keyword based on the determined number of co-occurrences, the probability of transition from the first preset keyword to the each second preset keyword being a ratio of the number of co-occurrences of the first preset keyword and the second preset keyword to a sum of the each determined number of co-occurrences.

In some embodiments, the determining an associated keyword associated with the determined preset keyword based on a pre-established associated relationship of the preset keyword comprises: determining the determined preset keyword as a target first preset keyword, determining a second preset keyword associated with the target first preset keyword according to the established associated relationship, and extracting the probability of transition from the target first preset keyword to the each associated second preset keyword; and determining the second preset keyword having a probability of transition greater than a preset probability as the associated keyword associated with the target first preset keyword.

In some embodiments, after the parsing page content browsed by a user to extract a keyword of the page content and determine a theme corresponding to the keyword, the method further comprises: presenting a link of the page content on a web page corresponding to the theme.

In a second aspect, an embodiment of the present disclosure provides an apparatus for pushing information, comprising: a first parsing unit, configured to parse page content browsed by a user to extract a keyword of the page content and determine a theme corresponding to the keyword; a first determining unit, configured to determine a preset keyword matching the keyword in a preset keyword collection; a second determining unit, configured to determine an associated keyword associated with the determined preset keyword based on a pre-established associated relationship of the preset keyword; and a pushing unit, configured to push information corresponding to the theme and/or the associated keyword to the user.

In some embodiments, the first parsing unit comprises: a first input module, configured to parse the page content browsed by the user to extract the keyword of the page content, and input the keyword into a pregenerated theme probability distribution model to obtain at least one first candidate theme and a probability of determining each one of the at least one first candidate theme as the theme corresponding to the keyword; a second input module, configured to input the keyword into a pregenerated generalization model to obtain at least one second candidate theme and a similarity between the keyword and each one of the at least one second candidate theme; and a fusion module, configured to fuse the at least one first candidate theme and the at least one second candidate theme to determine the theme corresponding to the keyword.

In some embodiments, the apparatus further comprises: a second parsing unit, configured to parse a plurality of preset texts to determine a keyword and a theme of each text and establish a corresponding relationship between the keyword and the theme of the text; a first statistical unit, configured to perform statistical calculation on the established corresponding relationship to determine a number of times of establishing the corresponding relationship between each keyword and each theme; and a generating unit, configured to generate the theme probability distribution model corresponding to the each determined keyword based on the number of times of establishing the corresponding relationship between the each determined keyword and the each theme.

In some embodiments, the apparatus further comprises: a third parsing unit, configured to parse a plurality of preset texts to generate a keyword collection for each text and determine a theme of the each text; a merging unit, configured to merge the keyword collections corresponding to the texts having same themes to generate a keyword collection corresponding to the each determined theme; an extracting unit, configured to extract, for the each determined theme, a characteristic keyword from the keyword collection corresponding to the theme based on a chi-square test apparatus; and a training unit, configured to train by using the characteristic keyword corresponding to the each determined theme as input based on a machine learning method to obtain the generalization model.

In some embodiments, the third parsing unit comprises: a word segmenting module, configured to perform, for the each text among the plurality of preset texts, word segmentation on the text, and delete a stop word, a preposition and an adverb among a plurality of words obtained after word segmentation to obtain the keyword collection corresponding to the text; and a third input module, configured to input the each text into a pretrained theme model to determine the theme of the each text, the theme model being configured to characterize a corresponding relationship between the text and the theme.

In some embodiments, the apparatus further comprises: a fourth parsing unit, configured to parse historical search data and historical browsing data to determine a first keyword and at least one second keyword associated with each first keyword; a calculating unit, configured to respectively calculate a similarity between the first keyword and each one of the at least one second keyword and each preset keyword in the preset keyword collection, to determine a preset keyword in the preset keyword collection having the maximum similarity to the first keyword as a first preset keyword, and respectively determine a preset keyword in the preset keyword collection having the maximum similarity to each second keyword as a second preset keyword; and an establishing unit, configured to respectively establish the associated relationship between the first preset keyword and each second preset keyword.

In some embodiments, the apparatus further comprises: a second counting unit, configured to count up a number of co-occurrences of the first preset keyword and the each second preset keyword according to the historical search data and the historical browsing data; and a third determining unit, configured to determine a probability of transition from the first preset keyword to the each second preset keyword based on the determined number of co-occurrences, the probability of transition from the first preset keyword to the each second preset keyword being a ratio of the number of co-occurrences of the first preset keyword and the second preset keyword to a sum of the each determined number of co-occurrences.

In some embodiments, the second determining unit comprises: a first determining module, configured to determine the determined preset keyword as a target first preset keyword, determine a second preset keyword associated with the target first preset keyword according to the established associated relationship, and extract the probability of transition from the target first preset keyword to the each associated second preset keyword; and a second determining module, configured to determine the second preset keyword having a probability of transition greater than a preset probability as the associated keyword associated with the target first preset keyword.

In some embodiments, the apparatus further comprises: a presenting unit, configured to present a link of the page content on a web page corresponding to the theme.

In a third aspect, an embodiment of the present disclosure provides a server, comprising: one or more processors; and a storage apparatus, configured to store one or more programs. When the one or more programs are executed by the one or more processors, the one or more processors are caused to implement the method for pushing information according to any one of the embodiments.

In a fourth aspect, an embodiment of the present disclosure provides a computer readable storage medium, storing a computer program. When the program is executed by the processor, the method for pushing information according to any one of the embodiments is implemented.

According to the method and apparatus for pushing information provided by the embodiments of the present disclosure, page content browsed by a user is parsed to extract a keyword and determine a theme corresponding to the keyword, then a preset keyword matching the keyword is determined, afterwards, an associated keyword is determined based on a pre-established associated relationship of the preset keyword, and finally information corresponding to the theme and/or the associated keyword is pushed to the user. In this way, information corresponding to the theme and/or associated keyword corresponding to the page content browsed by the user may be pushed, thereby implementing targeted information push.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
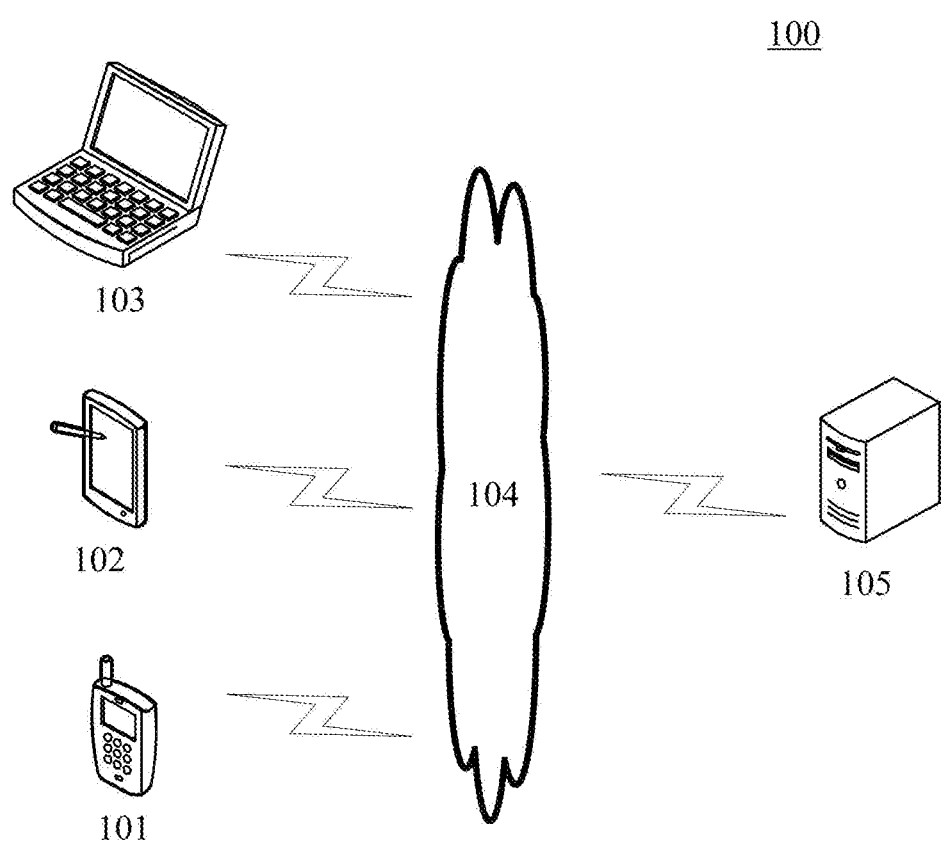
FIG. 1 is an exemplary architecture diagram of a system to which the present disclosure may be applied.

FIG. 1 illustrates an exemplary system architecture 100 to which the method for pushing information or apparatus for pushing information according to an embodiment of the present application may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as web browser applications, news information applications, shopping applications, search applications, instant messaging tools, mailbox clients, social platform software, may be installed on the terminal devices 101, 102 and 103.

The terminal devices 101, 102 and 103 may be various electronic devices capable of interacting with the server, including but not limited to, smart phones, tablet computers, laptop computers and desktop computers.

The server 105 may be a server providing various services, for example, a backend server providing support for pages displayed on the terminal devices 101, 102 and 103. The backend server may process, for example, parse page content browsed by a user, determine information such as a corresponding theme and an associated keyword, and push the relevant information to the user.

It is to be noted that the method for pushing information provided by the embodiment of the present disclosure generally is performed by the server 105. Correspondingly, the apparatus for pushing information generally is arranged in the server 105.

It is to be understood that the number of the terminal devices, the networks and the servers in FIG. 1 is merely exemplary. Any number of the terminal devices, the networks and the servers may be provided as required.

Figure 2:
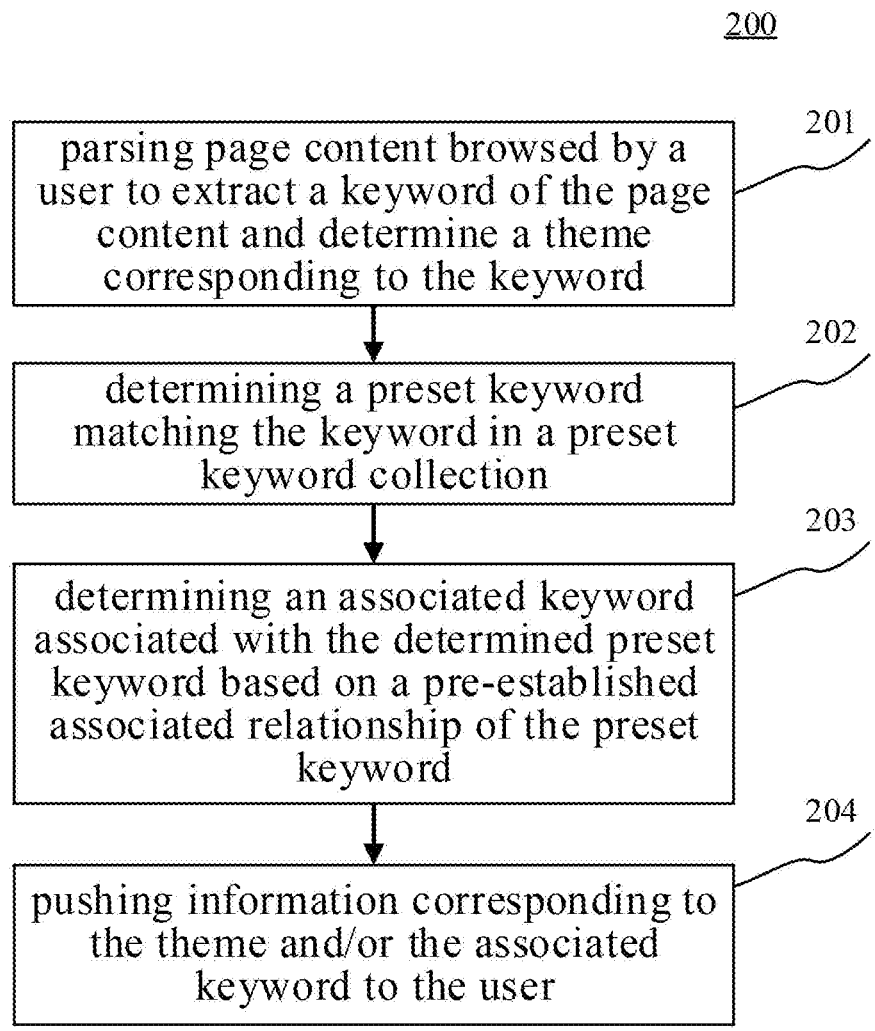
FIG. 2 is a flowchart of a method for pushing information according to an embodiment of the present disclosure.

Continuing referring to FIG. 2, a flow 200 of a method for pushing information according to an embodiment of the present disclosure is illustrated. The method for pushing information comprises following steps.

In Step 201, page content browsed by a user is parsed to extract a keyword of the page content and determine a theme corresponding to the keyword.

In this embodiment, the electronic device (such as the server 105 as shown in FIG. 1) on which the method for pushing information runs may parse the page content browsed by the user using various analysis methods to extract the keyword of the page content and then determine a theme corresponding to the keyword. The theme may be a word used for characterizing the category of the page content, for example, science and technology, physical education, society, and so on. In practice, the user may use various client applications (such as browser or news information applications, and search applications or the like) installed on clients (such as the terminal devices 101, 102 and 103 as shown in FIG. 1) to browse pages.

As an example, the electronic device may extract a keyword of the page content based on a pretrained deep neural network (DNN). Specifically, the electronic device may input the page content into the deep neural network, and determine a word outputted by the deep neural network as the keyword of the page content. The deep neural network may be configured to characterize the corresponding relationship between a text and a keyword. As an example, the deep neural network may be obtained by performing a supervised training on any activation function (for example, Sigmoid function, Softplus function, and bipolar Sigmoid function) based on a large number of training samples, where the training samples may comprise a large number of texts and a keyword corresponding to each text.

After determining the keyword of the text content, the electronic device may determine the theme corresponding to the keyword according to the following steps: the electronic device may first input the extracted keyword into a theme model, and then determine the theme outputted by the theme model as the theme corresponding to the keyword. The theme model may be configured to characterize a corresponding relationship between a text and a theme. As an example, the theme model may be obtained by performing a supervised training on an existing classification model such as a convolutional neural network (CNN) and a support vector machine (SVM) based on a large number of training samples, where the training samples may comprise a large number of texts and a keyword corresponding to each piece of text information.

In some alternative implementations of this embodiment, the electronic device may extract a keyword through the following steps. In the first step, the electronic device may perform word segmentation on the page content using various word segmentation methods. As an example, the above word segmentation method may be a statistics-based word segmentation method. Specifically, statistical calculation may be performed on a frequency of combination of each adjacent word in the page content to calculate out the frequency of occurrence of combination of the word. When the probability is higher than a preset probability threshold, it is determined that the above combination constitutes a word, thereby implementing the word segmentation of the page content. Furthermore, the above word segmentation method also may be a word segmentation method based on a string matching principle. The page content is matched with a character string in a machine dictionary of the electronic device using the string matching principle. The string matching principle may be a forward maximum matching method, a reverse maximum matching method, a set segmentation annotation method, a word-by-word traversal matching method, a forward optimum matching method, a reverse optimum matching method, and so on. In the second step, the electronic device may extract a keyword from the word obtained via the word segmentation. As an example, importance calculation may be performed on the word obtained via the word segmentation (for example, using a Term Frequency-Inverse Document Frequency (TF-IDF) method), and a preset number of (for example, five) words having the maximum importance are determined as keywords based on a result of importance calculation. As another example, the electronic device may prestore a keyword list, which comprises a plurality of keywords. The electronic device performs string matching on the word obtained via the word segmentation with a keyword in the keyword list, and extracts the matched word as the keyword.

It is to be noted that the electronic device may also determine the keyword in the page content through the above two ways. As an example, the keywords extracted through the above ways may be fused, and a preset number (for example, five) keywords may be selected from the fused keywords as the keywords of the page content.

In some alternative implementations of this embodiment, after determining the keyword of the text content, the electronic device may determine the theme corresponding to the keyword through the following steps. The electronic device may first input the page content into the pretrained theme model, and then determine the theme outputted by the theme model as the theme corresponding to the keyword.

In Step 202, a preset keyword matching the keyword in a preset keyword collection is determined.

In this embodiment, the electronic device may prestore the preset keyword collection composed of a lot of preset keywords. The electronic device may determine a preset keyword matching the keyword in the preset keyword collection by matching the keyword extracted in the Step 201 with the preset keyword in the preset keyword collection by way of string matching.

In Step 203, an associated keyword associated with the determined preset keyword is determined based on a pre-established associated relationship of the preset keyword.

In this embodiment, the above electronic device may pre-store the associated relationship of each preset keyword in the preset keyword collection. As an example, the preset keyword "basketball" is associated with the preset keywords "football" and "tennis ball". It is to be noted that the associated relationship of a preset keyword may either be pre-established by a technician or be pre-established after the electronic device makes statistical analysis of a mass of data. The electronic device may determine an associated keyword associated with the determined preset keyword based on the associated relationship of the preset keyword. As an example, the electronic device may directly determine a preset keyword having an associated relationship with the determined preset keyword as the associated keyword associated with the determined preset keyword.

In some alternative implementations of this embodiment, the associated relationship of the preset keyword may be pre-established through the following steps. In the first step, the electronic device may parse the stored historical search data and historical browsing data to determine a first keyword and at least one second keyword associated with each first keyword. Specifically, the electronic device may determine a search word in the historical search data as the first keyword, and determine a keyword in the content browsed after searching using the search word as the second keyword, or determine another search word used for searching again in the process of browsing the content after searching using the search word as the second keyword. The specific operation of extracting a keyword by the user from the content browsed after searching using the search word may be the same as that in the Step 201, and thus is not unnecessarily elaborated herein. In the second step, the electronic device may respectively calculate a similarity between the first keyword and each one of the at least one second keyword and each preset keyword in the preset keyword collection, determine a preset keyword in the preset keyword collection having the maximum similarity to the first keyword as a first preset keyword, and respectively determine a preset keyword in the preset keyword collection having the maximum similarity to each second keyword as a second preset keyword. In the third step, the electronic device may respectively establish the associated relationship between the first preset keyword and each second preset keyword to generate the associated relationship of the preset keyword in the preset keyword collection.

In some alternative implementations of this embodiment, after respectively establishing the associated relationship between the first preset keyword and the each second preset keyword, the electronic device may further count up a number of co-occurrences of the first preset keyword and the each second preset keyword according to the historical search data and the historical browsing data. Next, the electronic device may determine a probability of transition from the first preset keyword to the each second preset keyword based on the determined number of co-occurrences, where the probability of transition from the first preset keyword to the each second preset keyword is a ratio of the number of co-occurrences of the first preset keyword and the second preset keyword to a sum of the each determined number of co-occurrences.

In some alternative implementations of this embodiment, the electronic device may determine an associated keyword associated with the determined preset keyword according to the following steps: the electronic device may first determine the determined preset keyword as a target first preset keyword, determine a second preset keyword associated with the target first preset keyword according to the established associated relationship, extract the probability of transition from the target first preset keyword to each associated second preset keyword, and then determine the second preset keyword having a probability of transition greater than a preset probability as the associated keyword associated with the target first preset keyword. The preset probability may be a probability preset by a technician based on a large number of statistics.

In Step 204, information corresponding to the theme and/or the associated keyword is pushed to the user.

In this embodiment, the electronic device may first retrieve information corresponding to the theme and/or the associated keyword, and then may push the retrieved information to the user. As an example, the keywords of the page content are "mobile phone" and "processor", the theme is "science and technology", and the associated keywords are "tablet computer" and "portable computer". In this case, the electronic device may retrieve using the "science and technology" and/or "tablet computer" and/or "portable computer" as a search word, and push the retrieved information to the user.

Figure 3:
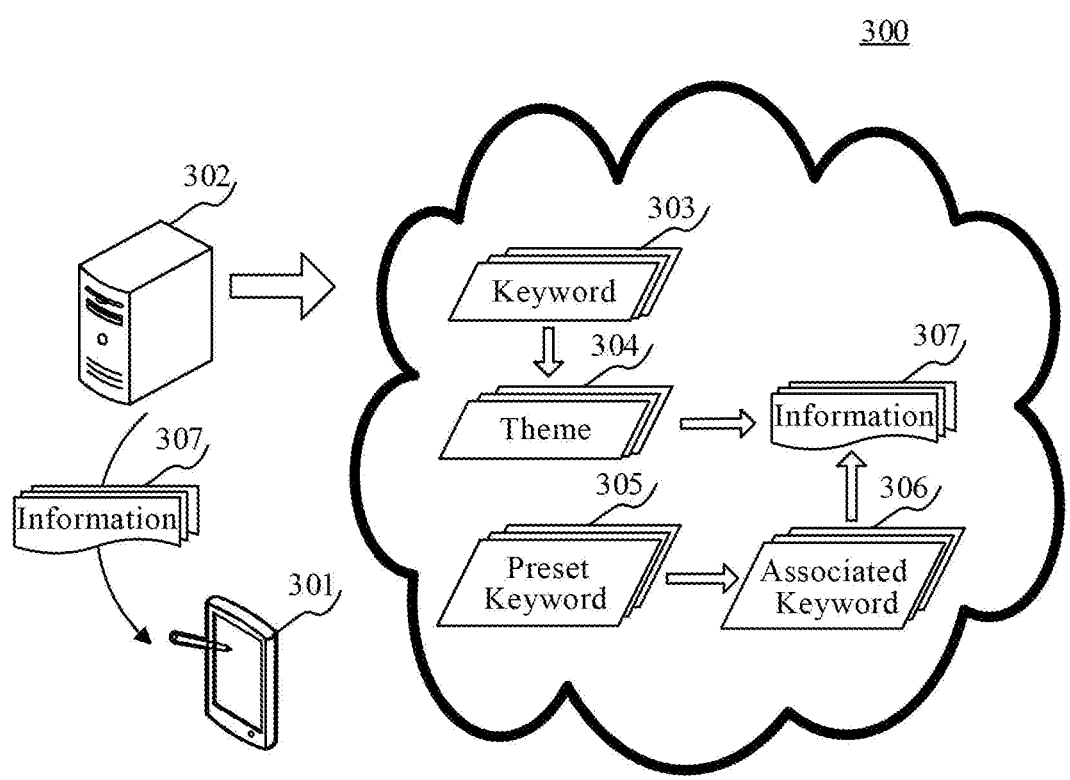
FIG. 3 is a schematic diagram of an application scenario of the method for pushing information according to the present disclosure.

Continuing referring to FIG. 3, a schematic diagram of an application scenario of the method for pushing information according to this embodiment is illustrated. In the application scenario of FIG. 3, first of all, the user uses a terminal device 301 to browse page content. Next, a server 302 parses the page content browsed by the user to extract a keyword 303 and a theme 304 corresponding to the keyword 303. Afterward, the server 302 determines a preset keyword 305 matching the keyword 303 from a preset keyword collection, and determines an associated keyword 306 based on a pre-established associated relationship of the preset keyword 305. Finally, the server 302 transmits information 307 corresponding to the theme 304 and/or the associated keyword 306 to the terminal device 301.

According to the method provided by the embodiment of the present disclosure, page content browsed by a user is parsed to extract a keyword and determine a theme corresponding to the keyword, then a preset keyword matching the keyword is determined, afterwards, an associated keyword is determined based on a pre-established associated relationship of the preset keyword, and finally information corresponding to the theme and/or the associated keyword is pushed to the user. In this way, information corresponding to the theme and/or associated keyword corresponding to the page content browsed by the user may be pushed, thereby implementing targeted information push.

Figure 4:
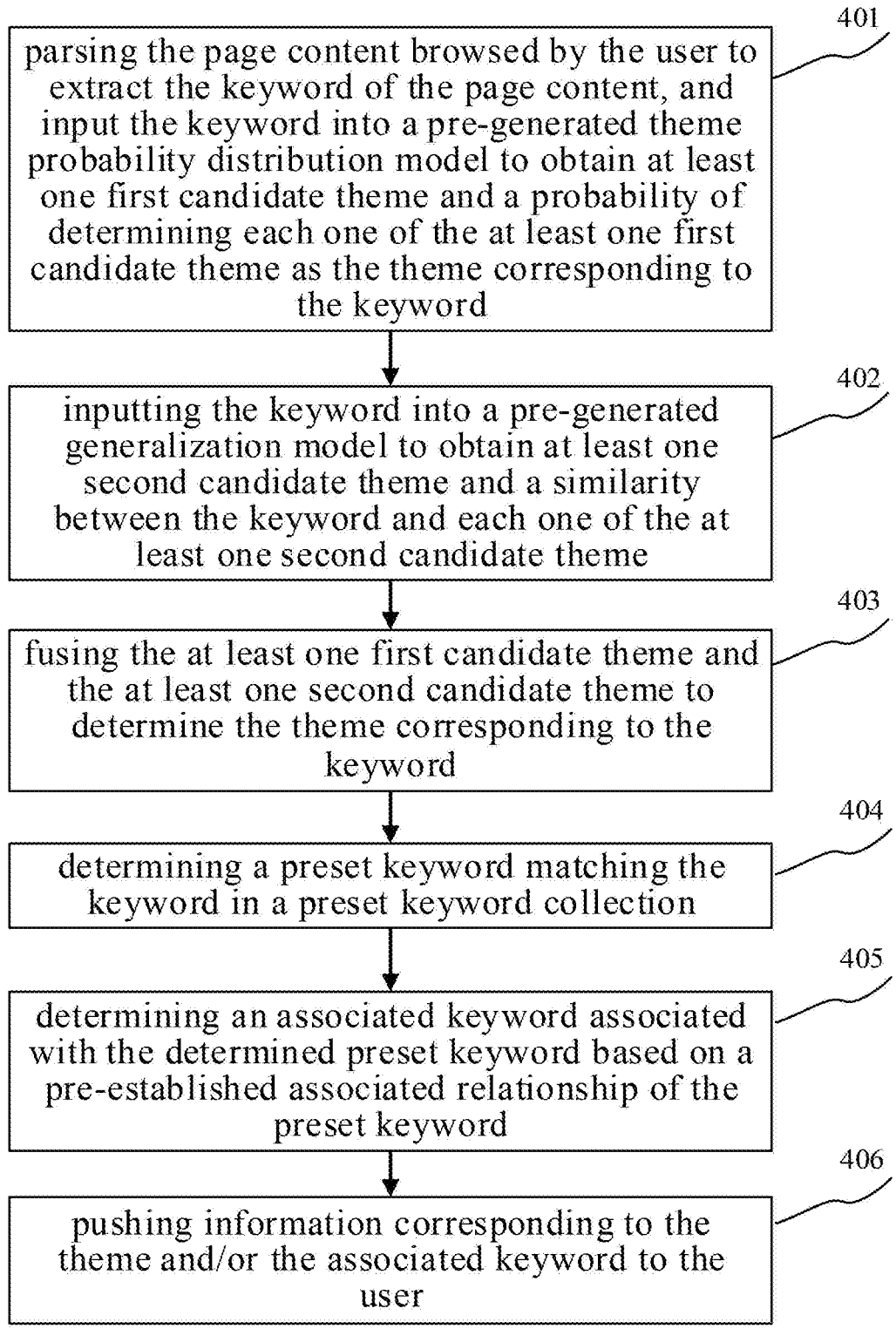
FIG. 4 is a flowchart of the method for pushing information according to another embodiment of the present disclosure.

Further referring to FIG. 4, a flow 400 of the method for pushing information according to still another embodiment is illustrated. The flow 400 of the method for pushing information comprises following steps.

In Step 401, the page content browsed by the user is parsed to extract the keyword of the page content, and inputting the keyword into a pregenerated theme probability distribution model to obtain at least one first candidate theme and a probability of determining each one of the at least one first candidate theme as the theme corresponding to the keyword.

In this embodiment, the electronic device (such as the server 105 as shown in FIG. 1) on which the method for pushing information runs may first parse the page content browsed by the user to extract the keyword of the page content. It is to be noted that the operation of extracting the keyword herein may be basically the same as that in the Step 201, and thus is not unnecessarily elaborated herein. Afterwards, the electronic device may input the keyword into a pregenerated theme probability distribution model to obtain at least one first candidate theme and a probability of determining each one of the at least one first candidate theme as the theme corresponding to the keyword. The theme probability distribution model may be configured to characterize a corresponding relationship between the keyword and the theme corresponding to the keyword. As an example, the theme probability model may be a corresponding relationship table pre-established by a technician and storing a lot of keywords and probabilities of corresponding keywords.

In some alternative implementations of this embodiment, the theme probability distribution model also may be generated through the following steps.

First, a plurality of preset texts may be parsed to determine a keyword and a theme of each text and establish a corresponding relationship between the keyword and the theme of the text. For example, the corresponding relationship between the keyword "mobile phone" and the theme "science and technology" is established, and the corresponding relationship between the keyword "football" and the theme "physical education" or "entertainment" is established. It is to be noted that the operation of determining a keyword and a theme of each text among the plurality of texts may be basically the same as that in the Step 201, and thus is not unnecessarily elaborated herein.

Next, statistical calculation may be performed on the established corresponding relationship to determine a number of times of establishing the corresponding relationship between each keyword and each theme. For example, the number of times of establishing the corresponding relationship between the keyword "football" and the theme "physical education" is 80 times, and the number of times of establishing the corresponding relationship between the keyword "football" and the theme "entertainment" is 20 times, and so on.

Finally, the theme probability distribution model corresponding to the each determined keyword may be generated based on the number of times of establishing the corresponding relationship between the each determined keyword and the each theme. For each keyword, the theme probability distribution model corresponding to the keyword may be configured to characterize a probability of each theme corresponding to the keyword. The probability of each theme corresponding to the keyword is a ratio of the number of times of establishing the corresponding relationship between the keyword and the theme to the total number of times of establishing the corresponding relationship between the keyword and each theme corresponding to the keyword. As an example, the themes having the corresponding relationship with the keyword "football" is the theme "physical education" and the theme "entertainment" respectively, the number of times of establishing the corresponding relationship between the keyword "football" and the theme "physical education" is 80 times, and the number of times of establishing the corresponding relationship between the keyword "football" and the theme "entertainment" is 20 times. In this case, the probability of the keyword "football" corresponding to the theme "physical education" is 80%, and the probability of the keyword "football" corresponding to the theme "entertainment" is 20%.

After the theme probability distribution model is generated, and after the keyword "football" is inputted into the generated theme probability distribution model, the theme "physical education" and the theme "entertainment" corresponding to the keyword "football" may be respectively determined as a first candidate theme, the probability of determining the first candidate theme "physical education" as the theme corresponding to the keyword is 80%, and the probability of determining the first candidate theme "entertainment" as the theme corresponding to the keyword is 20%.

In Step 402, the keyword is inputted into a pre-generated generalization model to obtain at least one second candidate theme and a similarity between the keyword and each one of the at least one second candidate theme.

In this embodiment, the electronic device may input the keyword extracted from the page content into the pregenerated generalization model to obtain at least one second candidate theme and a similarity between the keyword and each one of the at least one second candidate theme. The generalization model is configured to characterize the corresponding relationship of the similarity between the keyword and the theme corresponding to the keyword. As an example, the generalization model may be a corresponding relationship table pre-established by a technician and storing similarities between a lot of keywords and themes corresponding to the keywords.

In some alternative implementations of this embodiment, the generalization model also may be generated through the following steps.

First, a plurality of preset texts may be parsed to generate a keyword collection for each text and determine a theme of each text. Specifically, first of all, for the each text among the plurality of preset texts, a word segmentation may be performed on the text, and a stop word, a preposition and an adverb among a plurality of words obtained after word segmentation is deleted to obtain the keyword collection corresponding to the text. Next, each text may be inputted into a pretrained theme model to determine the theme of the each text, where the theme model may be configured to characterize a corresponding relationship between the text and the theme. It is to be noted that the operation of determining a theme herein may be basically the same as that in the Step 201, and thus is not unnecessarily elaborated herein.

Next, the keyword collections corresponding to the texts having same themes are merged to generate a keyword collection corresponding to the each determined theme.

Afterward, for the each determined theme, a characteristic keyword may be extracted from the keyword collection corresponding to the theme based on a chi-square test method. In practice, the chi-square test is a method for determining whether a theory is correct by observing an actual value and a theoretical value. Generally, first it is supposed that two variables (for example, a certain keyword and a certain theme) are independent (i.e., an original assumption), and then a degree of deviation between the actual value and the theoretical value is determined. If the deviation is small enough, it may be believed that an error is a natural sample error, which is either caused by imprecise measurement means or incidental, the two variables are independent, and in this case the original assumption is accepted. If the deviation is large enough, it may be believed that the actual value and the theoretical value are actually related, that is, the original assumption is not accepted. Therefore, the keyword related to each theme may be determined using the chi-square test method, and the determined relevant keyword is extracted as a characteristic keyword. It is to be noted that the method for extracting a characteristic keyword using the chi-square test method is the extensively studied and used well-known technique at present, which is not repeated any more herein.

Finally, based on a machine learning method, the generalization model may be obtained by training existing models for classifying based on a similarity calculation such as a naive Bayesian model (NBM) and a support vector machine by using the characteristic keyword corresponding to each theme as input.

In Step 403, the at least one first candidate theme and the at least one second candidate theme are fused to determine the theme corresponding to the keyword.

In this embodiment, the electronic device may fuse the at least one first candidate theme obtained in Step 401 and the at least one second candidate theme obtained in Step 402 in various ways to determine the theme corresponding to the keyword. As an example, the electronic device may first determine the same theme in the at least one first candidate theme and the at least one second candidate theme, perform weighted summation on the respectively obtained probability and similarity corresponding to the same theme according to a preset weight (for example, 0.5), and determine a numerical value obtained after the weighted summation as the probability of determining the same theme as the theme corresponding to the keyword. Next, the electronic device may determine the similarity corresponding to each second candidate theme different from the first candidate theme as the probability of determining the second candidate theme as the theme corresponding to the keyword. Finally, the electronic device may sort the obtained themes according to probability sequence from large to small, and select a preset number of (for example, two) themes according to the above sequence as the themes corresponding to the keywords.

In Step 404, a preset keyword matching the keyword in a preset keyword collection is determined.

In this embodiment, the electronic device may prestore the preset keyword collection composed of a lot of preset keyword. The electronic device may determine a preset keyword matching the keyword in the preset keyword collection by matching the extracted keyword with the preset keyword in the preset keyword collection by way of string matching.

In Step 405, an associated keyword associated with the determined preset keyword is determined based on a pre-established associated relationship of the preset keyword.

In this embodiment, the above electronic device may pre-store the associated relationship of each preset keyword in the preset keyword collection. The associated relationship of the preset keyword may be pre-established through the following steps. In the first step, the electronic device may parse the stored historical search data and historical browsing data to determine a first keyword and at least one second keyword associated with each first keyword. In the second step, a similarity between the first keyword and each one of the at least one second keyword and each preset keyword in the preset keyword collection may be respectively calculated, a preset keyword in the preset keyword collection having the maximum similarity to the first keyword is determined as a first preset keyword, and a preset keyword in the preset keyword collection having the maximum similarity to each second keyword is respectively determined as a second preset keyword. In the third step, the associated relationship between the first preset keyword and each second preset keyword may be respectively established to generate the associated relationship of the preset keyword in the preset keyword collection. In the fourth step, the number of co-occurrences of the first preset keyword and the each second preset keyword may be counted up according to the historical search data and the historical browsing data. Next, the electronic device may determine a probability of transition from the first preset keyword to the each second preset keyword based on the determined number of co-occurrences, where the probability of transition from the first preset keyword to the each second preset keyword is a ratio of the number of co-occurrences of the first preset keyword and the second preset keyword to a sum of the each determined number of co-occurrences.

In this embodiment, the electronic device may determine, through the following steps, an associated keyword associated with the preset keyword determined in the Step 404. First, the electronic device may determine the determined preset keyword as a target first preset keyword, determine a second preset keyword associated with the target first preset keyword according to the established associated relationship, and extract the probability of transition from the target first preset keyword to each associated second preset keyword. Next, the electronic device may determine the second preset keyword having a probability of transition greater than a preset probability as the associated keyword associated with the target first preset keyword. The preset probability may be a probability preset by a technician based on a large number of statistics.

In Step 406, information corresponding to the theme and/or the associated keyword is pushed to the user.

In this embodiment, the electronic device may first retrieve information corresponding to the theme and/or the associated keyword, and then may push the retrieved information to the user.

It is to be noted that the operations in the above Step 404-Step 406 are basically the same as those in the Step 202-Step 204, and thus are not unnecessarily elaborated herein.

As can be seen from FIG. 4, compared with the embodiment corresponding to FIG. 2, the flow 400 of the method for pushing information in this embodiment highlights the step of extracting a keyword of the page content based on the theme probability distribution model and the generalization model and determining a theme corresponding to the extracted keyword. Therefore, the solution as described in this embodiment may be combined with different manners to determine a theme, thereby increasing accuracy of determining the theme.

Figure 5:
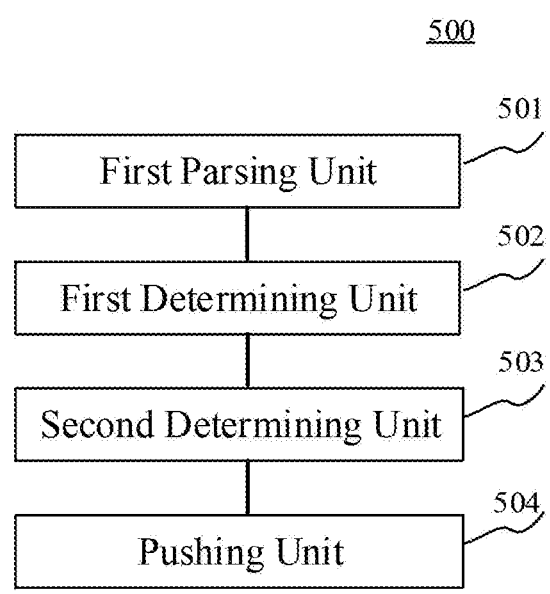
FIG. 5 is a schematic structural diagram of an apparatus for pushing information according to an embodiment of the present disclosure.

Further referring to FIG. 5, as an implementation of the method as shown in the foregoing figures, the present disclosure provides an embodiment of an apparatus for pushing information. The apparatus embodiment corresponds to the method embodiment as shown in FIG. 2, and the apparatus specifically may be used in various electronic devices.

As shown in FIG. 5, the apparatus 500 for pushing information in this embodiment comprises: a first parsing unit 501, configured to parse page content browsed by a user to extract a keyword of the page content and determine a theme corresponding to the keyword; a first determining unit 502, configured to determine a preset keyword matching the keyword in a preset keyword collection; a second determining unit 503, configured to determine an associated keyword associated with the determined preset keyword based on a pre-established associated relationship of the preset keyword; and a pushing unit 504, configured to push information corresponding to the theme and/or the associated keyword to the user.

In this embodiment, the first parsing unit 501 may parse the page content browsed by the user using various analysis methods to extract the keyword of the page content and determine the theme corresponding to the keyword.

In this embodiment, the apparatus 500 for pushing information may pre-store a preset keyword collection composed of a large number of preset keywords. The first determining unit 502 may determine a preset keyword matching the keyword in the preset keyword collection by matching the extracted keyword with the preset keyword in the preset keyword collection byway of string matching.

In this embodiment, the apparatus 500 for pushing information may pre-store the associated relationship of each preset keyword in the preset keyword collection. The second determining unit 503 may determine an associated keyword associated with the determined preset keyword based on the associated relationship of the preset keyword.

In this embodiment, the pushing unit 504 may first retrieve information corresponding to the theme and/or the associated keyword, and then may push the retrieved information to the user.

In some embodiments, the first parsing unit may comprise a first input module, a second input module, and a fusion module (not shown in the figures). The first input module may be configured to input the keyword into a pregenerated theme probability distribution model to obtain at least one first candidate theme and a probability of determining each one of the at least one first candidate theme as the theme corresponding to the keyword. The second input module may be configured to input the keyword into a pregenerated generalization model to obtain at least one second candidate theme and a similarity between the keyword and each one of the at least one second candidate theme. The fusion module may be configured to fuse the at least one first candidate theme and the at least one second candidate theme to determine the theme corresponding to the keyword.

In some alternative implementations of this embodiment, the apparatus 500 for pushing information may further comprise a second parsing unit, a first statistical unit, and a generating unit (not shown in the figures). The second parsing unit may be configured to parse a plurality of preset texts to determine a keyword and a theme of each text and establish a corresponding relationship between the keyword and the theme of the text. The first statistical unit may be configured to perform statistical calculation on the established corresponding relationship to determine a number of times of establishing the corresponding relationship between each keyword and each theme. The generating unit may be configured to generate the theme probability distribution model corresponding to the each determined keyword based on the number of times of establishing the corresponding relationship between the each keyword and the each theme.

In some alternative implementations of this embodiment, the apparatus 500 for pushing information may further comprise a third parsing unit, a merging unit, an extracting unit, and a training unit (not shown in the figures). The third parsing unit may be configured to parse a plurality of preset texts to generate a keyword collection for each text and determine a theme of the each text. The merging unit may be configured to merge the keyword collections corresponding to the texts having same themes to generate a keyword collection corresponding to the each determined theme. The extracting unit may be configured to extract, for the each determined theme, a characteristic keyword from the keyword collection corresponding to the theme based on a chi-square test apparatus. The training unit may be configured to train by using the characteristic keyword corresponding to the each determined theme as input based on a machine learning method to obtain the generalization model.

In some alternative implementations of this embodiment, the third parsing unit may comprise a word segmenting module and a third input module (not shown in the figures). The word segmenting module may be configured to perform, for the each text among the plurality of preset texts, a word segmentation on the text, and delete a stop word, a preposition and an adverb among a plurality of words obtained after the word segmentation to obtain the keyword collection corresponding to the text. The third input module may be configured to input the each text into a pretrained theme model to determine the theme of the each text, where the theme model is configured to characterize a corresponding relationship between the text and the theme.

In some alternative implementations of this embodiment, the apparatus 500 for pushing information may further comprise a fourth parsing unit, a calculating unit, and an establishing unit (not shown in the figures). The fourth parsing unit may be configured to parse historical search data and historical browsing data to determine a first keyword and at least one second keyword associated with each first keyword. The calculating unit may be configured to respectively calculate a similarity between the first keyword/ each one of the at least one second keyword and each preset keyword in the preset keyword collection, to determine a preset keyword in the preset keyword collection having the maximum similarity to the first keyword as a first preset keyword, and respectively determine a preset keyword in the preset keyword collection having the maximum similarity to each second keyword as a second preset keyword. The establishing unit may be configured to respectively establish the associated relationship between the first preset keyword and each second preset keyword.

In some alternative implementations of this embodiment, the apparatus 500 for pushing information may further comprise a second counting unit and a third determining unit (not shown in the figures). The second counting unit may be configured to count up a number of co-occurrences of the first preset keyword and the each second preset keyword according to the historical search data and the historical browsing data. The third determining unit may be configured to determine a probability of transition from the first preset keyword to the each second preset keyword based on the determined number of co-occurrences. The probability of transition from the first preset keyword to the each second preset keyword is a ratio of the number of co-occurrences of the first preset keyword and the second preset keyword to a sum of the each determined number of co-occurrences.

In some alternative implementations of this embodiment, the second determining unit may comprise a first determining module and a second determining module (not shown in the figures). The first determining module may be configured to determine the determined preset keyword as a target first preset keyword, determine a second preset keyword associated with the target first preset keyword according to the established associated relationship, and extract the probability of transition from the target first preset keyword to the each associated second preset keyword. The second determining module may be configured to determine the second preset keyword having a probability of transition greater than a preset probability as the associated keyword associated with the target first preset keyword.

In some alternative implementations of this embodiment, the apparatus 500 for pushing information may further comprise a presenting unit (not shown in the figures). The presenting unit may be configured to present a link of the page content on a web page corresponding to the theme.

According to the apparatus provided by the embodiment of the present disclosure, the first parsing unit 501 parses page content browsed by a user to extract a keyword and determine a theme corresponding to the keyword, then the first determining unit 502 determines a preset keyword matching the keyword, afterwards, the second determining unit 503 determines an associated keyword based on a pre-established associated relationship of the preset keyword, and finally the pushing unit 504 pushes information corresponding to the theme and/or the associated keyword to the user. In this way, information corresponding to the theme and/or associated keyword corresponding to the page content browsed by the user may be pushed, thereby implementing targeted information push.

Figure 6:
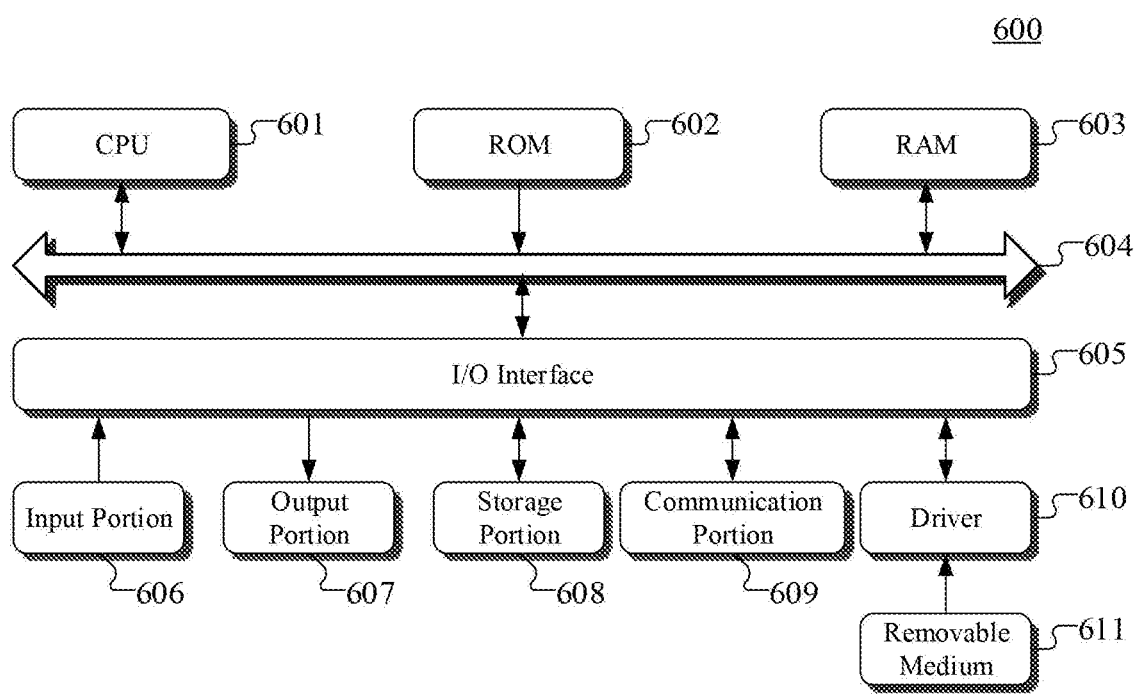
FIG. 6 illustrates a structural schematic diagram of a computer system adapted to implement a server according to an embodiments of the present disclosure.

Referring to FIG. 6, a schematic structural diagram of a computer system 600 adapted to implement a server of the embodiments of the present disclosure is shown. The server as shown in FIG. 6 is merely an example, and no limitation should be imposed on functions or scope of use of the embodiment of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present application. It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but is not limited to: a wireless medium, a wired medium, an optical cable medium, a RF medium and the like, or any combination thereof.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a first parsing unit, a first determining unit, a second determining unit, and a pushing unit, where the names of these units or modules are not considered as a limitation to the units or modules. For example, the first parsing unit may also be described as "a unit for parsing page content."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: pars page content browsed by a user to extract a keyword of the page content and determine a theme corresponding to the keyword; determine a preset keyword matching the keyword in a preset keyword collection; determine an associated keyword associated with the determined preset keyword based on a pre-established associated relationship of the preset keyword; and push information corresponding to the theme and/or the associated keyword to the user.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for pushing information, the method comprising:

parsing page content browsed by a user to extract a keyword of the page content and determine a theme corresponding to the keyword;

determining a preset keyword matching the keyword in a preset keyword collection;

determining an associated keyword associated with the determined preset keyword based on a pre-established associated relationship of the preset keyword; and pushing information corresponding to the theme or the associated keyword to the user, wherein the parsing page content browsed by a user to extract a keyword of the page content and determine a theme corresponding to the keyword comprises:

parsing the page content browsed by the user to extract the keyword of the page content, and inputting the keyword into a pre-generated theme probability distribution model to obtain at least one first candidate theme and a probability of determining each one of the at least one first candidate theme as the theme corresponding to the keyword;

inputting the keyword into a pre-generated generalization model to obtain at least one second candidate theme and a similarity between the keyword and each one of the at least one second candidate theme; and fusing the at least one first candidate theme and the at least one second candidate theme to determine the theme corresponding to the keyword, and wherein, fusing the at least one first candidate theme and the at least one second candidate theme to determine the theme corresponding to the keyword comprises:

determining one or more same themes among the at least one first candidate theme and the at least one second candidate theme;

determining a value obtained by performing a weighted summation on the probability and similarity corresponding to each of the same themes according to a preset weight as a first probability;

determining a similarity corresponding to each second candidate theme that is different from the first candidate theme as a second probability; and selecting a preset number of themes from the same themes and the second candidate theme that is different from the first candidate theme according to the first and second probabilities as the theme corresponding to the keyword.

2. The method according to claim 1, wherein before the parsing page content browsed by the user to extract the keyword of the page content and determine the theme corresponding to the keyword, the method further comprises generating the theme probability distribution model, comprising:

parsing a plurality of preset texts to determine a keyword and a theme of each text and establish a corresponding relationship between the keyword and the theme of the text;

performing statistical calculation on the established corresponding relationship to determine a number of times of establishing the corresponding relationship between each keyword and each theme; and generating the theme probability distribution model corresponding to the each determined keyword based on the number of times of establishing the corresponding relationship between the each keyword and the each theme.

3. The method according to claim 1, wherein before the parsing page content browsed by the user to extract the keyword of the page content and determine the theme corresponding to the keyword, the method further comprises generating the generalization model, comprising:

parsing a plurality of preset texts to generate a keyword collection for each text and determine a theme of the each text;

merging the keyword collections corresponding to the texts having same themes to generate a keyword collection corresponding to the each determined theme;

for the each determined theme, extracting a characteristic keyword from the keyword collection corresponding to the theme based on a chi-square test method; and training by using the characteristic keyword corresponding to the each theme as an input based on a machine learning method to obtain the generalization model.

4. The method according to claim 3, wherein the parsing a plurality of preset texts to generate a keyword collection for each text and determine a theme of the each text comprises:

performing, for the each text among the plurality of preset texts, a word segmentation on the text, and deleting a stop word, a preposition and an adverb among a plurality of words obtained after the word segmentation to obtain the keyword collection corresponding to the text; and inputting the each text into a pretrained theme model to determine the theme of the each text, the theme model being configured to characterize a corresponding relationship between the text and the theme.

5. The method according to claim 1, wherein before the parsing page content browsed by a user to extract a keyword of the page content and determine a theme corresponding to the keyword, the method further comprises establishing the associated relationship of the preset keyword, comprising:

parsing historical search data and historical browsing data to determine a first keyword and at least one second keyword associated with each first keyword;

respectively calculating a similarity between the first keyword and each one of the at least one second keyword, and each preset keyword in the preset keyword collection, to determine a preset keyword in the preset keyword collection having a maximum similarity to the first keyword as a first preset keyword, and respectively determine a preset keyword in the preset keyword collection having a maximum similarity to each second keyword as a second preset keyword; and respectively establishing the associated relationship between the first preset keyword and each second preset keyword.

6. The method according to claim 5, wherein after the respectively establishing the associated relationship between the first preset keyword and each second preset keyword, the method further comprises:

counting up a number of co-occurrences of the first preset keyword and the each second preset keyword according to the historical search data and the historical browsing data; and determining a probability of transition from the first preset keyword to the each second preset keyword based on the determined number of co-occurrences, the probability of transition from the first preset keyword to the each second preset keyword being a ratio of the number of co-occurrences of the first preset keyword and the second preset keyword to a sum of the each determined number of co-occurrences.

7. The method according to claim 6, wherein the determining an associated keyword associated with the determined preset keyword based on a pre-established associated relationship of the preset keyword comprises:

determining the determined preset keyword as a target first preset keyword, determining a second preset keyword associated with the target first preset keyword according to the established associated relationship, and extracting the probability of transition from the target first preset keyword to the each associated second preset keyword; and determining the second preset keyword having a probability of transition greater than a preset probability as the associated keyword associated with the target first preset keyword.

8. The method according to claim 1, wherein after the parsing page content browsed by a user to extract a keyword of the page content and determine a theme corresponding to the keyword, the method further comprises:

presenting a link of the page content on a web page corresponding to the theme.

9. An apparatus for pushing information, the apparatus comprising:

at least one processor; and a memory storing instructions, which when executed by the at least one processor, cause the at least one processor to perform operations, the operations comprising:

parsing page content browsed by a user to extract a keyword of the page content and determine a theme corresponding to the keyword;

determining a preset keyword matching the keyword in a preset keyword collection;

determining an associated keyword associated with the determined preset keyword based on a pre-established associated relationship of the preset keyword; and pushing information corresponding to the theme and/or the associated keyword to the user, wherein the parsing page content browsed by a user to extract a keyword of the page content and determine a theme corresponding to the keyword comprises:

parsing the page content browsed by the user to extract the keyword of the page content, and inputting the keyword into a pregenerated theme probability distribution model to obtain at least one first candidate theme and a probability of determining each one of the at least one first candidate theme as the theme corresponding to the keyword;

inputting the keyword into a pregenerated generalization model to obtain at least one second candidate theme and a similarity between the keyword and each one of the at least one second candidate theme; and fusing the at least one first candidate theme and the at least one second candidate theme to determine the theme corresponding to the keyword, and wherein, fusing the at least one first candidate theme and the at least one second candidate theme to determine the theme corresponding to the keyword comprises:

determining one or more same themes among the at least one first candidate theme and the at least one second candidate theme;

determining a value obtained by performing a weighted summation on the probability and similarity corresponding to each of the same themes according to a preset weight as a first probability;

determining a similarity corresponding to each second candidate theme that is different from the first candidate theme as a second probability; and selecting a preset number of themes from the same themes and the second candidate theme that is different from the first candidate theme according to the first and second probabilities as the theme corresponding to the keyword.

10. The apparatus according to claim 9, wherein before the parsing page content browsed by the user to extract the keyword of the page content and determine the theme corresponding to the keyword, the operations further comprises generating the theme probability distribution model, comprising:

parsing a plurality of preset texts to determine a keyword and a theme of each text and establish a corresponding relationship between the keyword and the theme of the text;

performing statistical calculation on the established corresponding relationship to determine a number of times of establishing the corresponding relationship between each keyword and each theme; and generating the theme probability distribution model corresponding to the each determined keyword based on the number of times of establishing the corresponding relationship between the each keyword and the each theme.

11. The apparatus according to claim 9, wherein before the parsing page content browsed by the user to extract the keyword of the page content and determine the theme corresponding to the keyword, the operations further comprises generating the generalization model, comprising:

parsing a plurality of preset texts to generate a keyword collection for each text and determine a theme of the each text;

merging the keyword collections corresponding to the texts having same themes to generate a keyword collection corresponding to the each determined theme;

for the each determined theme, extracting a characteristic keyword from the keyword collection corresponding to the theme based on a chi-square test apparatus; and training by using the characteristic keyword corresponding to each determined theme as input based on a machine learning method to obtain the generalization model.

12. The apparatus according to claim 11, wherein the parsing a plurality of preset texts to generate a keyword collection for each text and determine a theme of the each text comprises:

performing, for the each text among the plurality of preset texts, a word segmentation on the text, and deleting a stop word, a preposition and an adverb among a plurality of words obtained after the word segmentation to obtain the keyword collection corresponding to the text; and inputting the each text into a pretrained theme model to determine the theme of the each text, the theme model being configured to characterize a corresponding relationship between the text and the theme.

13. The apparatus according to claim 9, wherein before the parsing page content browsed by a user to extract a keyword of the page content and determine a theme corresponding to the keyword, the operations further comprises establishing the associated relationship of the preset keyword, comprising:

parsing historical search data and historical browsing data to determine a first keyword and at least one second keyword associated with each first keyword;

respectively calculating a similarity between the first keyword and each one of the at least one second keyword and each preset keyword in the preset keyword collection, to determine a preset keyword in the preset keyword collection having a maximum similarity to the first keyword as a first preset keyword, and respectively determine a preset keyword in the preset keyword collection having a maximum similarity to each second keyword as a second preset keyword; and respectively establishing the associated relationship between the first preset keyword and each second preset keyword.

14. The apparatus according to claim 13, wherein after the respectively establishing the associated relationship between the first preset keyword and each second preset keyword, the operations further comprises:

counting up a number of co-occurrences of the first preset keyword and the each second preset keyword according to the historical search data and the historical browsing data; and determining a probability of transition from the first preset keyword to the each second preset keyword based on the determined number of co-occurrences, the probability of transition from the first preset keyword to the each second preset keyword being a ratio of the number of co-occurrences of the first preset keyword and the second preset keyword to a sum of the each determined number of co-occurrences.

15. The apparatus according to claim 14, wherein the determining an associated keyword associated with the determined preset keyword based on a pre-established associated relationship of the preset keyword comprises:

determining the determined preset keyword as a target first preset keyword, determine a second preset keyword associated with the target first preset keyword according to the established associated relationship, and extracting the probability of transition from the target first preset keyword to the each associated second preset keyword; and determining the second preset keyword having a probability of transition greater than a preset probability as the associated keyword associated with the target first preset keyword.

16. The apparatus according to claim 9, wherein after the parsing page content browsed by a user to extract a keyword of the page content and determine a theme corresponding to the keyword, the operations further comprising:

presenting a link of the page content on a web page corresponding to the theme.

17. A non-transitory computer storage medium storing a computer program, which when executed by a processor, causes the processor to perform operations, the operations comprising:

parsing page content browsed by a user to extract a keyword of the page content and determine a theme corresponding to the keyword;

determining a preset keyword matching the keyword in a preset keyword collection;

determining an associated keyword associated with the determined preset keyword based on a pre-established associated relationship of the preset keyword; and pushing information corresponding to the theme or the associated keyword to the user, wherein the parsing page content browsed by a user to extract a keyword of the page content and determine a theme corresponding to the keyword comprises:

parsing the page content browsed by the user to extract the keyword of the page content, and inputting the keyword into a pre-generated theme probability distribution model to obtain at least one first candidate theme and a probability of determining each one of the at least one first candidate theme as the theme corresponding to the keyword;

inputting the keyword into a pre-generated generalization model to obtain at least one second candidate theme and a similarity between the keyword and each one of the at least one second candidate theme; and fusing the at least one first candidate theme and the at least one second candidate theme to determine the theme corresponding to the keyword, and wherein, fusing the at least one first candidate theme and the at least one second candidate theme to determine the theme corresponding to the keyword comprises:

determining one or more same themes among the at least one first candidate theme and the at least one second candidate theme;

determining a value obtained by performing a weighted summation on the probability and similarity corresponding to each of the same themes according to a preset weight as a first probability;

determining a similarity corresponding to each second candidate theme that is different from the first candidate theme as a second probability; and selecting a preset number of themes from the same themes and the second candidate theme that is different from the first candidate theme according to the first and second probabilities as the theme corresponding to the keyword.

* * * * *